(12) United States Patent
Kruik et al.

(10) Patent No.: US 7,754,260 B2
(45) Date of Patent: Jul. 13, 2010

(54) COATING AND COMPOSITE FROZEN CONFECTIONS

(75) Inventors: Adrianus Cornelis Kruik, Eh Bergijk (NL); Wolfgang Gaeng, Le Mont St. Adrien (FR)

(73) Assignee: Nestec S.A., Vevey (CH)

( * ) Notice: Subject to any disclaimer, the term of this patent is extended or adjusted under 35 U.S.C. 154(b) by 751 days.

(21) Appl. No.: 10/820,880

(22) Filed: Apr. 9, 2004

(65) Prior Publication Data

US 2004/0224055 A1    Nov. 11, 2004

Related U.S. Application Data

(63) Continuation of application No. PCT/EP02/10704, filed on Sep. 24, 2002.

(30) Foreign Application Priority Data

Oct. 12, 2001  (EP) .................................. 01124506

(51) Int. Cl.
*A21D 13/08*    (2006.01)

(52) U.S. Cl. ............................ 426/275; 426/94; 426/95; 426/100; 426/101; 426/139; 426/660

(58) Field of Classification Search ................. 426/94, 426/100, 101, 139, 660
See application file for complete search history.

(56) References Cited

U.S. PATENT DOCUMENTS

| 3,508,926 | A | 4/1970 | Sanford et al. .................... 99/1 |
| 4,542,028 | A | 9/1985 | Butcher et al. ............... 426/100 |
| 6,723,358 | B1 * | 4/2004 | van Lengerich ............... 426/94 |
| 6,861,082 | B2 * | 3/2005 | Laffont et al. ................. 426/95 |

FOREIGN PATENT DOCUMENTS

| CA | 950750 | * | 7/1974 |
| FR | 73 38105 | | 5/1974 |

* cited by examiner

*Primary Examiner*—Lien Tran
(74) *Attorney, Agent, or Firm*—K&L Gates LLP

(57) ABSTRACT

A composite ice confectionery article is made by bringing ice confectionery into contact with a biscuit-like mass, wherein the biscuit-like mass is liquid and pumpable at a temperature of 10° C. and above and has a biscuit-like consistency on storage and consumption.

13 Claims, No Drawings

COATING AND COMPOSITE FROZEN CONFECTIONS

CROSS-REFERENCE TO RELATED APPLICATIONS

This application is a continuation of International Application PCT/EP02/10704 filed Sep. 24, 2002, the entire content of which is expressly incorporated herein by reference thereto.

BACKGROUND OF THE INVENTION

The present invention is concerned with a coating, core or inclusion, composite frozen confections containing it and a process for the preparation of such composite frozen confections.

In the field of ice confectionery there is a need to procuring new eating experiences and new textures. Particularly attractive is the contrast of texture between a soft aerated ice confectionery and crispy inclusions or coating layers.

In U.S. Pat. No. 4,542,028, composite ice confection cakes comprising a multiplicity of superimposed successive thin layers of ice cream separated by interleaved very thin chocolate layers are made by successively extruding ice cream ribbons through slotted extrusion outlets on a conveyor, spraying thin chocolate layers on the ice cream ribbons and cutting portions transversally to the multilayered strand being conveyed.

Composite ice confections are known which consist of an ice cream combined with a biscuit or a crisp wafer, in particular of the type such as cakes, bars and cones, cigars or sandwiches made of wafer surrounding an ice cream or filled with ice cream. These products must include a system which makes the biscuit or the wafer impervious to the moisture coming from the ice cream, in order to prevent it from losing its crisp nature, either during storage or during consumption. This is usually carried out by coating either the surface of the biscuit in contact with the ice cream, or the ice cream itself, with a fatty composition, for example, with chocolate or with a coating that contains chocolate.

It has been suggested, e.g. in U.S. Pat. No. 3,508,926, to reuse crumb or ground baked biscuit for secondary products, e.g., as inclusions in bulk ice cream. The problem that existed in those type products was that the baked food particles lost their crispness in the presence of water coming from the ice cream. In baked food materials, the starch is gelatinized in the baking process and becomes receptive to moisture. In order to solve the problem of high water absorptivity of particles of food material containing gelatinized starch, it was suggested to mix the particles of food material with a mixture of a shortening and emulsifier, then to rewet them, preferably with a sugar syrup and to finally dry them. The resulting crunchy particles could be used as inclusions in bulk ice cream without losing their crunchiness and crispiness.

French patent application FR-A-2204363 discloses a biscuit composition which is also suitable for use in ice cream without losing its crispy character. This composition is made by forming a dispersion of chocolate in a sugar syrup in the presence of an emulsifier, heating the dispersion, incorporating into it a cooked biscuit flour, cooling and forming the paste obtained into agglomerated biscuit sheets or cups into which or between which ice cream is deposited.

Despite these products, there is still a need for ice cream confectioneries that contain crispy biscuit or biscuit type particles or materials therein, and this need is satisfied by the present invention.

SUMMARY OF THE INVENTION

In accordance with the present invention there is provided a mass that looks like a biscuit at $-10°$ C. or below, but is liquid from $15°$ C. or above, and which can be processed with ice confectionery as a coating, core or inclusion. The mass comprises a mixture of baked biscuit particles and a fat and maintains its biscuit-like consistency on storage and consumption.

The invention also concerns a frozen confection comprising ice confectionery and this biscuit-like mass as a coating or inclusion.

The invention further concerns a process for manufacturing a composite frozen confection that includes a biscuit-like mass as a coating, core or inclusion and an ice confectionery. The process comprises reducing, such as by comminuting, crushing or grinding, a biscuit or biscuit crumbs to particulate form, and in particular to granular or powdered form. These particles are admixed with a fat at a temperature between $25°$ C. and $35°$ C. to form a homogeneous biscuit-like mass, and then the ice confectionery and biscuit-like mass are brought into contact to form the composite frozen confection.

DETAILED DESCRIPTION OF THE PREFERRED EMBODIMENTS

The biscuit-like mass of the invention advantageously comprises a mixture of particles of baked biscuit and fat, with the biscuit particles being homogeneously dispersed in a continuous fat phase. The mixture contains 20 to 60% by weight and preferably 40 to 60% by weight of biscuit particles and 80 to 40% and preferably 60 to 40% by weight of fat.

The fat preferably has a solid fat content of about 95% at $10°$ C. and about 5% at $25°$ C. Suitable fats employed herein are selected from the group consisting of partially hydrogenated vegetable oil, e.g. vegetable oils commonly used in food such as cottonseed or soybean oil, unmodified coconut fat, fractionated palm oil, partly fractionated milk fat and mixtures of those fats. Any vegetable fat or mixture which melting point is between about 10 and $35°$ C. and with the required melting characteristics as outlined hereinbefore can be used with similar results in the context of the invention. Preferably, the fat is high oleic partially hydrogenated vegetable oil. Chocolate, nut paste, peanut paste or fat based confectionery "compound" coatings based on cocoa butter, and including cocoa butter equivalents, may be used as a fat and/or as flavor base in an amount representing 5 to 50% by weight of the amount of fat that is used.

Biscuit powder, preferably containing more than 97% by weight dry matter may be used alone or combined with other type of dry powder ingredients selected from the group consisting of cocoa, cereal, preferably rice, milk, nuts or coffee. In the case of cocoa, cereal, milk in an amount of non biscuit powder representing preferably from 1 to 50% by weight of the powders and in the case of nuts and coffee representing preferably from 0.5 to 15% by weight of the powders.

Dry sugar, e.g. saccharose, fructose, dextrose, glucose may be added for taste and texture in a taste or texture effective amount and up to 30% by weight of the whole biscuit-like mass.

Salt and spices may be added, depending on the perception expected. Natural or artificial flavors and colors may also be added, depending on the perception expected. Included pieces may be added as granulates or particles of 1 to 5 mm in diameter, which are selected from the group consisting of biscuit crumbs, meringue, nuts, confectionery, candies, cereal, fruit, chocolate in an amount representing up visually perceptible amount up to 25% by weight of the biscuit mass.

The preferred biscuit-like mass of the invention is generally a liquid that is pumpable at about 15 to 35° C. and has a soft to crispy consistency at ice confectionery temperature of about −10° C. to −25° C., as this allows it to be processed as a coating or inclusion with ice confectionery. For carrying out the process for manufacturing the biscuit-like mass, biscuits or biscuit crumbs are reduced by comminuting, crushing or grinding, to a particulate form, such as fine granular or powdered form. All the ingredients except the biscuit, flavor and colors are warmed up in a double-jacketed tank under continuous stirring at a temperature of from 25 to 35° C. Then the biscuits or biscuit particles are mixed in along with any other particles, sugar, flavors, and colors to form a homogeneous mass in such a way that lumps and incorporation of air are avoided. The mass is then transferred to a double-jacketed tank and maintained under continuous slow stirring at temperature of from 25 to 45° C.

The preferred frozen composite products of the invention comprise alternate zones of biscuit-like material and ice confectionery.

In the present context of the invention, ice confectionery is an aerated ice composition, for example aerated ice cream, sherbet or sorbet or ice yogurt having a soft texture which is extruded or molded. Aeration may be included to provide an overrun of between 40 and 150%, and preferably at 80 to 120%. In the case where the ice confectionery is extruded, it is processed in a freezer where it is aerated and extruded at about −5° C. to −6° C. When the ice confectionery is molded, a mix is filled at positive temperature into molds where it is frozen in a refrigerated environment and then demolded.

The confectionery composition may consist of distinct ice cream, sherbet or sorbet or ice yogurt of a different color. Perfumes may be co-extruded or the ice confectionery may contain syrups, sauces or small inclusion particles of e.g., nuts, chocolate or dried fruit so as to produce a composite, marbled or spotted body of ice confection having a substantially soft texture.

In addition to the contrasted ice confectionery and biscuit-like layers or zones, the composite products may contain layers or zones of additional material such as thin layers of fat-based crispy material, preferably chocolate or confectionery coating, layers or cups of biscuit or chocolate coated sugar wafer and thus be cones, filled with ice confectionery which can end in ball top or sandwiches with a filling of ice confectionery between sheets of biscuit.

The molded or extruded sticks, top cones, cups or sandwiches are thus prepared according to regular known processes. In a first embodiment of the process, after being frozen, the ice confectionery articles, at a temperature of from −25° C. to −10° C. are dipped partially or totally into the homogeneous maintained biscuit-like mass at a temperature of from 25 to 35° C. from 1 to 5 s. They then are dried during 10 to 30 s according to the thickness and composition of the biscuit-like mass in an atmosphere, preferably one that contains about 50% humidity. To speed up the drying time, the coated article may be dipped in a bath of cryogenic liquid, e.g., nitrogen or may be sprayed with a cryogenic liquid. The biscuit-like coating may be applied on a conventional ice confectionery core or on a core which has already been coated beforehand with chocolate or a confectionery "compound" as previously indicated. In an alternative, the biscuit-like coating may be covered with chocolate or a confectionery "compound" or with a dry particulate coating.

The biscuit-like mass may constitute a shell or a core or an inclusion, as desired.

In a second embodiment where the biscuit-like mass is provided as a shell, the biscuit-like mass is dosed from the bottom to the top in a mold at a temperature of from 20 to 45° C. according to the type of fat used on a regular molding line and sucked back after a holding time in the mold which defines the shell thickness. An ice confectionery, i.e. an ice cream or a water ice, is then dosed into the shell. The same technology can be applied to produce a cone, a cup or a bar. In this embodiment, a shell can be formed by dosing the biscuit-like mass from the bottom to the top in a mold at a temperature of from 20 to 45° C. according to the type of fat used, with the step conducted on a regular molding line. The mold can be held to form a solid shell of the biscuit-like mass therein, and liquid biscuit-like mass can be sucked back or otherwise removed from the mold to form an open cavity in the shell. Finally, an ice confectionery is dosed into the open cavity of the shell.

In a third embodiment where the biscuit-like mass is provided as a core or inclusion, the biscuit-like mass can be dosed with a regular filler in an ice confectionery molded shell at a temperature of from 25 to 45° C. Alternatively, the biscuit-like mass can be injected in an ice confectionery molded core with a pencil type of filler at a temperature of from 5 to 45° C. according to the type of fat used. Injection of the biscuit-like mass can as well create a partial or complete core or inclusion to a cone, a cup, a bulk, a bar, a cake or a portion.

In a fourth embodiment of the process, the ice confectionery articles, after being frozen at a temperature of from −35° C. to −10° C., are covered partially or totally with the homogeneous maintained biscuit-like mass by enrobing at a temperature of from 15 to 45° C. They then are dried during 10 to 30 s according to thickness and composition of the biscuit-like mass in an atmosphere preferably containing about 50% humidity. To speed up the drying time, the coated article may be dipped in a bath of cryogenic liquid, e.g., nitrogen, or sprayed with a cryogenic liquid. The biscuit-like coating may be applied on a naked ice confectionery core or on a core which has already been coated beforehand with chocolate or confectionery "compound" as previously indicated. In an alternative, the biscuit-like coating may be covered with chocolate or a confectionery "compound" or with a dry particulate coating before of after contacting the ice confection.

The same technology can be applied to produce a cake, a portion, a sandwich or a bar.

An important distinction from known processes is that, in the process of the invention, there is no water added in the preparation of the biscuit-like mass. As a consequence, there is no emulsion of the fat with an aqueous phase containing sugar and no dramatic increase of the viscosity of the mass as in the case where chocolate is mixed with water and sugar. This enables the liquid formulation to processed in a regular ice confection coating or injection operations.

At eating temperatures of e.g., −18° C. to −15° C., the texture of the biscuit-like coating or inclusion can be from soft to crispy depending from the composition of the biscuit-like mass. The overall dry matter content of the biscuit-like mass preferably is of from 95 to 99.5% by weight. The viscosity of the biscuit-like mass preferably is from 0.5 to 4 Pa·s (500 to 10000 cps) at temperatures of from 15 to 45° C.

EXAMPLES

In the following examples, parts and percentages are by weight unless otherwise specified.

Example 1

In this embodiment, a coated extruded ice cream bar stick is prepared. A vanilla flavored ice cream mix containing milk solids, emulsifier, vegetable fat, butter, sugar syrup and glucose of about 37% solids is processed in a freezer to an aerated ice cream of 90% overrun which is extruded at −6° C.

Separately, 40% butter flavored and sugar-containing comminuted short bread biscuit crumbs, 10% powder sugar, flavors, colors and a fat blend of 60% partially hydrogenated vegetable fat representing 60% of the total are thoroughly mixed at 30° C. to a homogeneous biscuit mass which is liquid and pumpable and which is fed to an open dipping tank provided with a stirrer.

The aerated ice cream mass is pumped through a former and vertically extruded. In the extrusion line, the former gives the shape to the cross-section of the product, depending on the shape of the extrusion die. A slab is cut out of the extruded strand by means of a conventional hot wire cutter. A stick is inserted laterally into the cut slab, the cutter timing determining the thickness of the product, and the product is evacuated to a cooling tunnel by an underlying plate conveyor. After being cooled to −25° C., the sticked slabs are taken over from the plate conveyor by a chain provided with claws for the sticks and dipped into the tank containing the liquid biscuit mass maintained at a temperature of about 30° C. during from 1 to 5 s in a humidity atmosphere preferably at about 50%. After drying during 10 to 30 s the coated sticks are packed in a flow-pack operation and stored in cold storage at −30° C.

The stick-bar has a coating of biscuit-like texture which confers a contrasting sensation in comparison to that of the ice milk mass upon consumption.

Example 2

In this embodiment, a composite molded stick ice cream is prepared. A vanilla flavored ice mix containing milk solids, stabilizer gum, sugar syrup and glucose of about 32% solids is poured into molds, frozen in a refrigerating bath to an ice milk core, a stick is inserted and the molded stick bar is thereafter demolded.

Separately, 40% butter flavored and sugar-containing comminuted short bread biscuit crumbs, 5% powder sugar, coffee powder, hazelnut paste and a fat blend of 50% partially hydrogenated vegetable fat representing 50% of the total are thoroughly mixed at 35° C. to form a homogeneous biscuit mass which is liquid and pumpable and which is fed to an open dipping tank provided with a stirrer.

The molded core at −10° C. is taken over by a chain provided with claws for the stick and dipped into the tank containing the liquid biscuit mass maintained at a temperature of about 30° C. during from 1 to 5 s in an atmosphere of about 50% humidity. After drying during 10 to 30 s the coated stick is packed in a flow-pack operation and stored in cold store at −30° C.

The stick-bar has a coating of biscuit-like texture, which confers a contrasting sensation in comparison to that of the ice milk mass upon consumption.

Example 3

A biscuit mass is prepared as in Example 1, which is used in a shell and core molding process. The liquid mass at 30° C. is dosed from the bottom to the top of a mold traveling in a refrigerated atmosphere at −35° C. and, after a holding time of 5 s, a solidified layer is obtained. The still liquid center is sucked out to form a shell of the solidified layer. An ice cream is then dosed into the formed shell as a core and a stick is inserted. Finally the composite stick bar is demolded is packed in a flow-pack operation and stored in cold storage at −30° C.

The stick-bar has a coating of biscuit-like texture which confers a contrasting sensation in comparison to that of the ice milk mass upon consumption.

Example 4

A water ice thick-wall molded shell of 3 mm thickness is prepared in a mold by the shell and core process. Using a regular filler, a liquid biscuit mass prepared as in Example 1 is dosed at 30° C. with the shell, a stick is inserted, the composite product is demolded, packed in a flow-pack operation and stored in cold storage at −30° C.

The stick-bar has a core of biscuit-like texture which confer a contrasting sensation in comparison to that of the water ice shell upon consumption.

Example 5

A dome shaped portion is prepared by first forming an ice cream molded body in a mold in cup shape and then injecting a liquid biscuit mass at 10° C. prepared as in Example 1 into its center with a pencil type of filler. After demolding, the portion is coated with a chocolate coating containing minced almond particles in an enrober. This forms an ice cream confectionery having a biscuit-like core and a chocolate nut containing coating.

Example 6

In this embodiment, a coated extruded ice cream bar is prepared. A conventional vanilla flavored ice cream mix containing milk solids, emulsifier, vegetable fat, butter, sugar syrup and glucose of about 37% solids is processed in a freezer to an aerated ice cream of 90% overrun which is extruded at −6° C.

Separately, 35% chocolate biscuit crumbs, 10% powder sugar, salt and a fat blend of 55% fractionated palm oil representing 55% of the total are thoroughly mixed at 35° C. to a homogeneous biscuit mass which is liquid and pumpable and which is fed to a double jacket tank that is provided with a stirrer.

The aerated ice cream mass is pumped through a former and is then horizontally extruded. In the extrusion line, the former gives the shape to the cross-section of the product, depending on the shape of the extrusion die. A slab is cut out of the extruded strand by means of a conventional hot wire cutter. The cutter timing determining the length of the product, and the product is evacuated to a cooling tunnel by an underlying plate conveyor. After being cooled to −25° C., the bars are taken over from the plate conveyor to an enrober and covered by the liquid biscuit mass maintained at a temperature of about 30° C. in a humidity atmosphere preferably at about 50%. After drying and hardening for 1 to 3 minutes in a cooling/nitrogen spraying tunnel, the coated bars are then again covered by an enrober containing white chocolate. After drying and hardening for 30 to 60 seconds in a cooling/nitrogen spraying tunnel, the coated bars are packed in a flow-pack operation and stored in cold storage at −30° C.

The bar has a coating of biscuit-like texture which confers a contrasting sensation in comparison to that of the ice milk mass upon consumption.

Example 7

In this embodiment, a coated ball top ice cream cone is prepared. A vanilla flavored ice cream mix containing milk solids, emulsifier, vegetable fat, butter, sugar syrup and glucose of about 37% solids is processed in a freezer to an aerated ice cream of 100% overrun which is dosed at −6° C. Separately, 35% chocolate biscuit crumbs, 10% powder sugar, salt and a fat blend of 55% fractionated palm oil representing 55% of the total are thoroughly mixed at 35° C. to a homogeneous biscuit mass which is liquid and pumpable and which is fed to an open dipping tank provided with a stirrer.

The aerated ice cream mass is dosed into a biscuit cone which is coated with a thin layer of chocolate coating. In the cone line, the movement of the nozzle gives the ball top shape to the product. The product is evacuated to a hardening tunnel. After being cooled to −25° C., the cones are in an upside down position and a up and down moving dipping station coats the ball top ice cream totally to the beginning of the wafer cone by the liquid biscuit mass. After drying and hardening for 30 to 60 seconds in a cooling/nitrogen spraying unit, the coated cones packed in a flow-pack operation and stored in cold storage at −30° C.

Each of the products made by the present invention provide new and contrasting textures compared to conventional products that do not include the biscuit-like mass of the present invention.

What is claimed is:

1. A biscuit mass that has the appearance of a biscuit at a temperature of −10° C. or below, but which is a liquid at a temperature of 15° C. or above, and which keeps its biscuit consistency on storage at temperatures suitable for ice confections and upon subsequent consumption, comprising a mixture consisting essentially of particles of baked biscuit and at least one fat, wherein the fat is selected from the group consisting of partially hydrogenated vegetable oil, unmodified coconut fat, fractionated palm oil, partly fractionated milk fat and mixtures thereof, wherein the mixture contains 20 to 60% by weight of the biscuit particles and 40 to 80% by weight of the fat and wherein the fat has a solid fat content of about 95% at 10° C. and about 0% at 25° C.

2. The biscuit mass of claim 1, wherein a portion of the biscuit particles is replaced by a dry powder ingredient selected from the group consisting of cocoa, cereals, milk, nuts, coffee and combinations thereof.

3. A composite frozen confection which comprises a coating, core or inclusion of the biscuit mass of claim 1 and an ice confectionery associated therewith.

4. The composite frozen confection of claim 3, in which the ice confectionery is an aerated ice composition, aerated ice cream, sherbet or sorbet or an ice yogurt having a soft texture.

5. The composite frozen confection of claim 3, in which the ice confectionery is aerated to an overrun of between 40 and 150%.

6. The composite frozen confection of claim 3, in which the ice confectionery is aerated to an overrun of between 80 to 120%.

7. The composite frozen confection of claim 3, in which the ice confectionery is extruded and includes a colored ice cream, sherbet, sorbet or ice yogurt having a color that is different from that of a perfume or flavoring composition which is co-extruded with the ice confectionery so as to produce a composite, marbled or spotted body having a substantially soft texture.

8. The composite frozen confection of claim 7 wherein the flavoring composition is selected from the group consisting of a syrup, sauce, small inclusion particles and combinations thereof, wherein the small inclusion particles are selected from the group consisting of nuts, chocolate, dried fruit and combinations thereof.

9. The composite frozen confection of claim 7, which comprises additional edible materials to impart different textures to the confection.

10. The composite frozen confection of claim 9, wherein the additional edible materials include fat-based crispy material, chocolate or a confectionery coating.

11. The composite frozen confection of claim 3, in the form of a stick-bar, a cone, a sandwich, a cup, a bulk, a cake, a portion or a bar.

12. The biscuit mass of claim 2, wherein the cocoa, cereals and milk represents from 1 to 50% by weight of the particles and powder.

13. The biscuit mass of claim 2, wherein the nuts and coffee represents from 0.5 to 15% by weight of the particles and powder.

* * * * *